(No Model.)

H. HUBBARD.
AUTOMATIC STOCK WATERER.

No. 436,082. Patented Sept. 9, 1890.

Witnesses
Albert B. Blackwood
Carleton Ewell

Inventor
Henry Hubbard
by Soule & Co
his Attorneys

UNITED STATES PATENT OFFICE.

HENRY HUBBARD, OF BARNARD, MISSOURI.

AUTOMATIC STOCK-WATERER.

SPECIFICATION forming part of Letters Patent No. 436,082, dated September 9, 1890.

Application filed June 25, 1890. Serial No. 356,624. (No model.)

*To all whom it may concern:*

Be it known that I, HENRY HUBBARD, of Barnard, in the county of Nodaway and State of Missouri, have invented certain new and useful Improvements in Automatic Stock-Waterers, of which the following is a specification.

My invention relates to that class of watering apparatus wherein a trough is automatically furnished with water from a tank or other source of supply, the apparatus being so constructed that water is admitted to the trough when its contents are withdrawn and ceases to flow when the trough is filled.

The invention consists in a novel construction of apparatus of this general character, whereby such apparatus is rendered simple and inexpensive in construction, durable and convenient, and extremely efficient for the purposes for which it is designed.

The invention is illustrated in the accompanying drawings, wherein—

Figure 1:
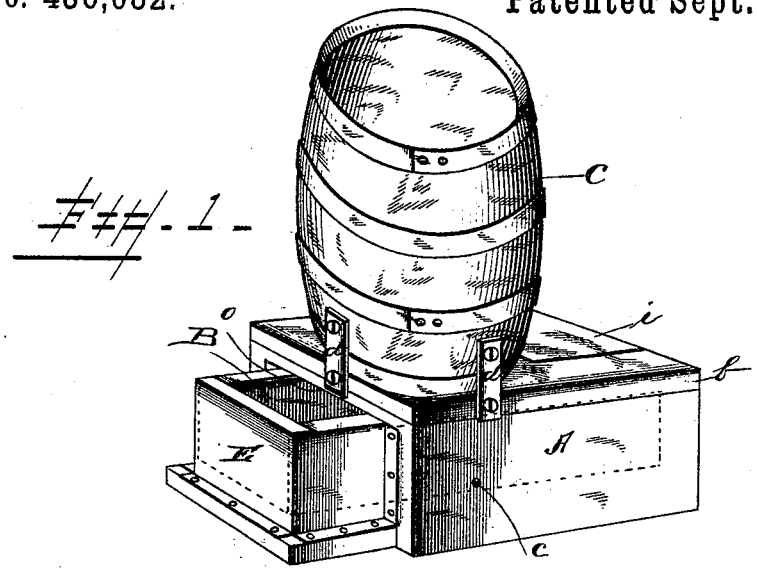
Figure 2:
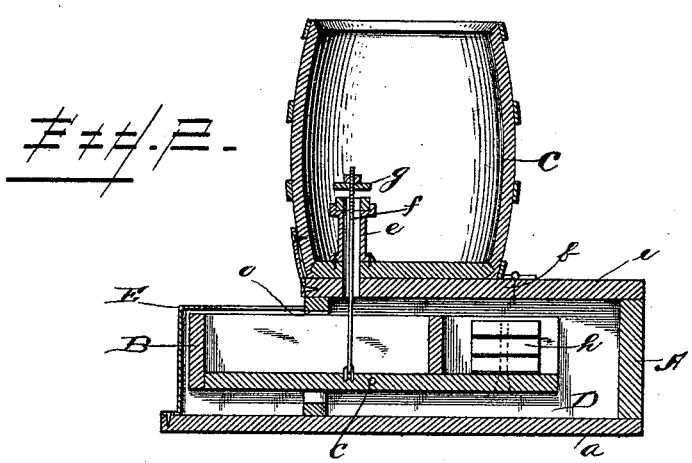
Figure 3:
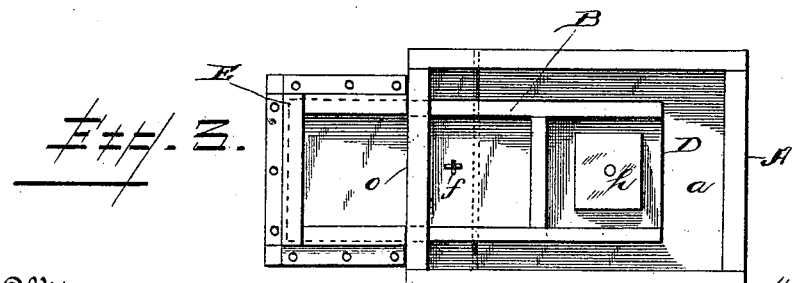

Figure 1 is a perspective view of the apparatus. Fig. 2 is a vertical longitudinal section, and Fig. 3 is a plan view of the apparatus with the supply-tank and casing-covering removed.

The apparatus consists, essentially, in the casing A, the trough B, and the supply-tank C. The casing A is a simple rectangular box having the bottom $a$ and having its top permanently closed by the cover $b$, which may be nailed or screwed to the casing or otherwise secured thereupon.

Within the box or casing A is pivoted the trough B, the forward end of which projects through an aperture $o$ in one end of the casing. This aperture $o$ extends from the bottom of the casing A to such a height as to allow the trough to normally occupy a substantially horizontal position. The trough may be conveniently pivoted by means of a rod $c$, passing laterally therethrough and journaled in opposite sides of the casing. The trough is constructed and arranged so that the portion thereof back of the pivoting-rod $c$ is heavier than the forward portion, and the forward end is thus normally held in an elevated position, its upward movement being limited by the longitudinal extent of the aperture $o$. The trough is thus normally maintained in a horizontal position. Although the rear end of the trough is heavier than the front end, the greater holding capacity of the trough is forward of the pivoting-rod.

Mounted on the top of the casing A is the supply-tank C, which may be a hogshead or a barrel, as shown in the drawings, the said supply-tank being secured to the casing in any suitable manner, such as by metallic straps $d$ $d$.

In the bottom of the tank or barrel C is formed an aperture, which registers with a similar aperture in the top $b$ of the casing. Extending through these apertures is a tubular plug or spout $e$, which preferably projects upward beyond the bottom of the barrel. Through the spout $e$ water is supplied to the trough below.

Pivotally secured to the bottom of the trough B, forward of the pivoting-rod, is a rod or wire $f$, which extends upwardly from the trough, passing through the spout $e$. On its upper end, above the top of the projecting spout $e$, the rod or wire $f$ carries a suitable valve-disk $g$, which is screwed thereon or otherwise secured thereto. Normally the valve $g$ is located a short distance above the top of the projecting spout $e$, thus leaving the passage through the spout free for the flow of water into the trough B. A rubber ring or washer may be applied to the upper projecting end of the spout $e$, so as to provide for a close fit between the valve $g$ and the end of the spout.

The rod or wire $f$, carrying the valve-disk $g$, constitutes, in connection with the projecting spout $e$, the simple mechanism by means of which the water from the tank C is automatically supplied as needed to the trough B.

In operation, the tank or barrel C having been filled with water, the water flows through the spout $e$ into the trough. When the quantity of water in the trough is such that the forward end thereof overbalances the normally heavier rear end, the trough tilts. The downward movement of the forward portion of the trough pulls down the rod or wire $f$, thus causing the valve $g$ to seat against the end of the spout $e$, and consequently stopping the flow of water from the tank. As the trough tilts, the water, which occupies a position back of the pivoting rod $c$, is caused to flow into the forward part of the trough, thus increasing its weight and causing the valve $g$ to press more firmly against its seat. The trough is now full, ready for use, and the flow thereto has ceased. When, however, the trough has been partially emptied by the drinking of animals or otherwise, the water therein ceases to hold down the forward end of the trough, and the trough resumes its horizontal position, thereby raising the valve $g$ and permitting the refilling of the trough from the tank C. When filled, the trough again tilts, thus cutting off the supply until a further emptying of the trough. By this means the trough is kept continually supplied with a proper amount of pure clean water.

It will be obvious that the amount of water which is required to tilt the trough will depend upon the relative normal weight of the two ends of the trough. If the rear end of the trough is made considerably heavier than the forward end, the trough will be well filled before it tilts. If, however, there is but slight difference between the normal weight of the two ends, then a comparatively small amount of water in the trough will tilt the same. The construction of the trough in this respect, therefore, will depend upon the amount of water which it is desired shall ordinarily be contained therein.

When so desired, the trough may have at its rear end a compartment D, adapted to hold any suitable removable weight or weights $h$ for varying the relative weight of the two ends of the trough, and thus regulating the quantity of water which the trough will normally hold.

An opening may be provided in the cover $b$ of the casing, behind the tank C, through which access may be had to the compartment D of the trough. This opening may be provided with a hinged door $i$.

As already described, the forward end of the trough projects from the casing through the aperture $o$. If this projecting end were left unprotected, the operation of the apparatus would be liable to be interfered with and the pivoted trough would be subject to displacement and injury. Accordingly a shield E is provided, which entirely surrounds the projecting end of the trough. This shield E is preferably formed of a single piece of sheet-iron or tin, which is bent into the proper shape, the two ends of the metal being secured to the casing A on opposite sides of the aperture $o$. The metal is bent inward at its upper edges, the bent edges of the metal occupying a plane coincident with the top of the aperture $o$. The bottom $a$ of the casing A may be extended, as shown, to serve as a support for the shield E, and to this extension of the bottom $a$ the shield E may be secured in any proper manner. The shield E not only prevents interference with the automatic movement of the trough, but it also gives to the improved apparatus all of the advantages of a fixed trough, since the exposed portions of the apparatus are firm and stationary, while the movable trough is protected from injury and interference by the inclosing casing and shield.

The improved stock-waterer will be thus seen to be very simple in construction and inexpensive in its manufacture. It is compact in form, and can be easily transported without interfering with the arrangement of any of its parts. While it is very efficient as an automatic waterer, the nature of its construction renders it hardly less durable than a simple trough of ordinary construction.

I claim as my invention—

1. In a stock-watering apparatus, a casing having an aperture in one end thereof and a tilting trough journaled in said casing and adapted to be automatically supplied with water, one end of said trough projecting through the aperture in said casing, in combination with a shield adjacent to said casing and surrounding the projecting end of said trough, substantially as set forth.

2. The casing A, having an aperture in one end thereof, the bottom $a$ of said casing being extended in front of said aperture, and the tilting trough B, journaled in said casing and adapted to be automatically supplied with water, one end of said trough projecting through the aperture in said casing, in combination with a shield supported on the extended portion of said bottom $a$ and surrounding the projecting end of said trough, said shield at its upper edge projecting inwardly above the upper margin of said trough, substantially as set forth.

In witness whereof I have hereunto signed my name in the presence of two subscribing witnesses.

HENRY HUBBARD.

Witnesses:
CHARLES A. HAWKINS,
JOHN B. KILDOW.